Patented Apr. 18, 1939

2,154,423

UNITED STATES PATENT OFFICE 2,154,423

COMPOSITION OF MATTER AND PROCESS FOR RESOLVING PETROLEUM EMULSIONS

Melvin De Groote, University City, and Bernhard Keiser and Charles M. Blair, Jr., Webster Groves, Mo., assignors to The Tret-O-Lite Company, Webster Groves, Mo., a corporation of Missouri No Drawing. Application August 12, 1938, Serial No. 224,463

18 Claims. (Cl. 196—4)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil", "roily oil", "emulsified oil", etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

Another object of our invention is to provide a new material or composition of matter that is particularly adapted for use as a demulsifier in the resolution of crude oil emulsions, but which may have uses in other arts that we have not yet investigated.

The new compound or composition of matter which constitutes one feature of our present invention consists of a certain kind of complex amine derived (a) by reaction between a dibasic carboxy acid body, such as phthalic anhydride, and (b) simpler amines of the kind hereinafter described. Said new compound or composition of matter is particularly adapted for use as a demulsifier for crude oil emulsions either alone or in admixture with conventional demulsifying agents of a compatible type.

The process which constitutes the other feature of our present invention consists in subjecting a petroleum emulsion of the water-in-oil type to the action of a demulsifying agent consisting of the new material or composition of matter above described, thereby causing the emulsion to break and separate into its component parts of oil and water or brine when the emulsion is permitted to remain in a quiescent state after treatment or is subjected to other equivalent separatory procedures.

Inasmuch as the demulsifying agent employed in our process constitutes a new chemical compound or new composition of matter, we deem it advisable to describe the raw materials entering into the manufacture of the same, as well as the method of manufacture.

One can obtain or manufacture chemical compounds whose composition is indicated by the following formulas:

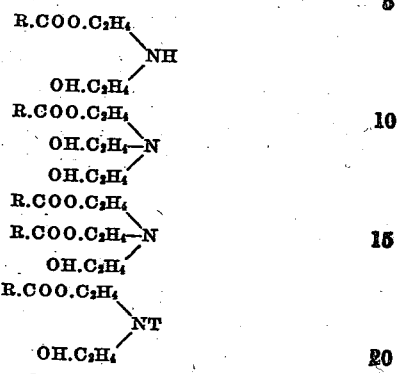

The compounds above described may be summarized by the following formula:

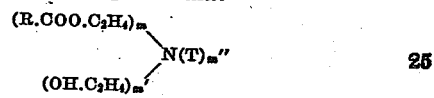

in which $m$ represents the number 1 or 2, $m'$ represents the number 1 or 2, and $m''$ represents the number 0 or 1, with the proviso that $m+m'+m''=3$.

However, the radical $C_2H_4$ which appears in the above formula may represent any similar radical, such as a $C_3H_6$ radical, $C_6H_8$ radical, etc., and therefore the above formula may be rewritten:

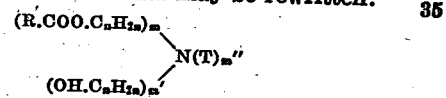

where $n$ represents a small whole number, preferably not over 10.

In the above group, T represents a hydrogen atom or a non-hydroxy aliphatic hydrocarbon radical, such as a methyl, ethyl, propyl, amyl, or similar radical; or T may represent a non-hydroxy alicyclic radical, such as a cyclohexyl radical, or a non-hydroxy aralkyl radical, such as a benzyl radical; or the acylated radical obtained by replacing a hydrogen atom of the hydroxyl group of an alkylol radical by the acyl radical of a monobasic carboxy acid, such as acetic acid, butyric acid, heptoic acid, or the like, all of which are characterized by having less than 8 carbon atoms. The alkylol radical prior to acylation may be a hydroxy alicyclic or a hydroxy aralkyl radical, provided that the hydroxy radical is attached to the aliphatic residue of the aralkyl radical.

In the above formula, R.COO represents the oxy-acyl or acid radical derived from the acid R.COOH. R.COOH represents any monobasic detergent-forming carboxy acid, such as a typical fatty acid or abietic acid or naphthenic acid. Typical fatty acids are those which occur in naturally-occurring oils and fats and generally have eight or more carbon atoms and not over 32 carbon atoms. Common examples include oleic acid, stearic acid, linoleic acid, linolenic acid, ricinoleic acid, erucic acid, palmitic acid, myristic acid, etc. These acids combine with alkali to produce soap or soap-like materials and are commonly referred to as being monobasic detergent-forming carboxy acids. Blown oils (oxidized oils) are not included.

The alkylol radical previously referred to prior to esterification may be a hydroxy alicyclic or a hydroxy aralkyl radical, provided that the hydroxy radical is attached to the aliphatic residue of the aralkyl radical.

As to the amines above described, which happen to be tertiary amines, it may be well to point out that these may be formed readily by a reaction involving an ester of the selected detergent-forming acid, for instance, a fatty acid ester, such as the glyceride, and a corresponding amine. This may be illustrated in the following manner:

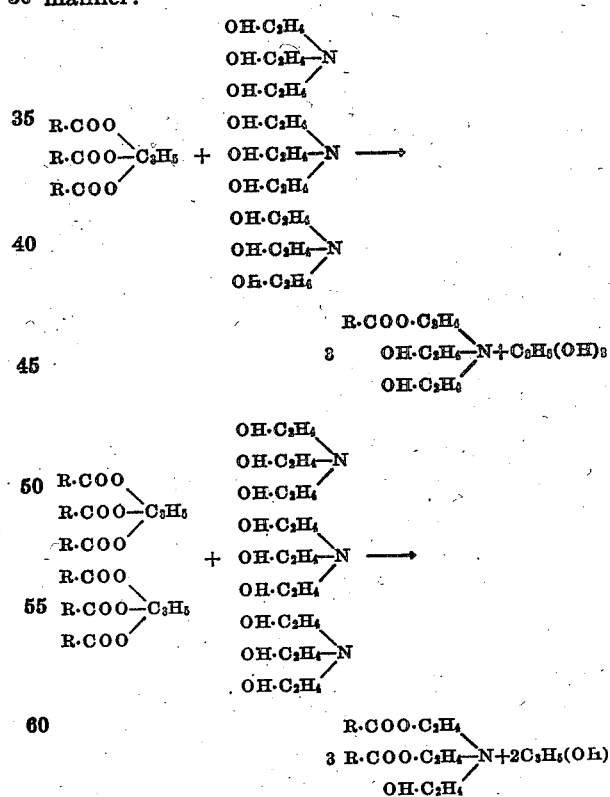

Reference is made to copending application for patent, Ser. No. 180,993, filed December 21, 1937, by Melvin De Groote, Bernhard Keiser, and Charles M. Blair, Jr.

If triethanolamine as employed in the above formula is replaced by ethyl diethanolamine, then one would obtain one of the remaining types of tertiary amines illustrated. Reference is made to copending application for patent, Ser. No. 206,903, filed May 9, 1938, by De Groote, Keiser, and Blair, Jr.

In the remaining type of material there is an amino hydrogen atom present. The manufacture of such material may be illustrated by the following reactions:

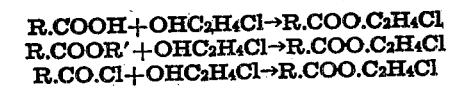

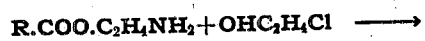

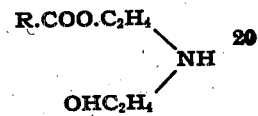

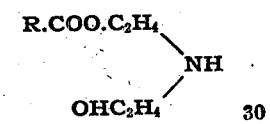

However, if maximum yields are not necessary, one need not resort to reactions of the kind previously described to produce secondary amines, but one may employ the following type of reaction:

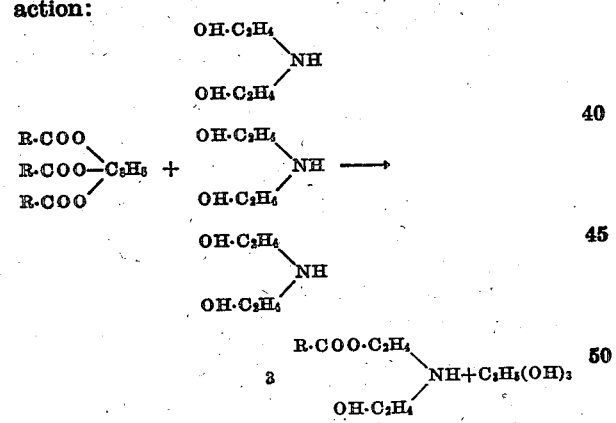

Suitable primary and secondary amines which may be employed to produce materials of the kind above described include the following: diethanolamine, monoethanolamine, ethyl ethanolamine, methyl ethanolamine, propanolamine, dipropanolamine, propyl propanolamine, etc. Other examples include cyclohexanolamine, dicyclohexanolamine, cyclohexyl ethanolamine, cyclohexyl propanolamine, benzylethanolamine, benzylpropanolamine, pentanolamine, hexanolamine, octylethanolamine, octadecylethanolamine, cyclohexanolethanolamine, etc.

Similarly, suitable tertiary amines which may be employed include the following: triethanolamine, diethanolalkylamines, such as diethanol methyl amine, diethanol ethylamine, diethanol propylamine, etc. Other examples include tripropanolamine, dipropanol methylamine, cyclohexanol diethanolamine, dicyclohexanol ethylamine, benzyl diethanolamine, benzyl dipropanolamine, tripentanolamine, trihexanolamine, octadecyl diethanolamine, polyethanolamine, etc.

It is also known that one may have amines of the type:

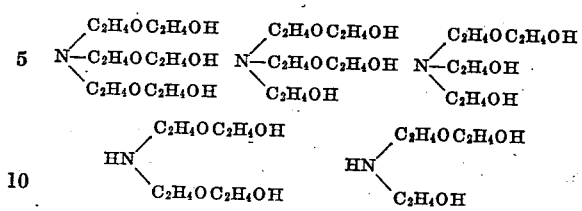

Such amines may serve as functional equivalents of the previously described amines and which are free from an ether linkage.

All of the amines of the kind above described and characterized by the formula:

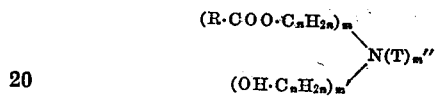

in which $m$ represents the number 1 or 2, $m'$ represents the number 1 or 2, and $m''$ represents the number 0 or 1, with the proviso that $m+m'+m''=3$; and $n$ represents a small whole number, preferably not over 10, have four common characteristics. In the first place, these amines are not quaternary ammonium bases or salts thereof. The expression "quaternary ammonium" is properly and conventionally applied to compounds in which all four hydrogen atoms of the ammonium radical $NH_4$ have been replaced by a hydrocarbon radical or oxy-hydrocarbon radical, as, for example, in trimethyl phenyl ammonium hydroxide.

Secondly, an important characteristic which must be recognized is that these amine compounds are not amides. It is to be noted that an amide formation involves a product in which there is a direct linkage between the carboxylic carbon atom and the nitrogen atom in the amine. This is not the case in the compounds employed as intermediate raw materials for production of the compounds used as demulsifying agents in the present process.

In the third place, it must be recognized that these compounds are derived only from basic amines. The word "basic" is employed to exclude amines having little or no basicity such as the ordinary aromatic amines or any amine having at least one aryl radical directly joined to the amino nitrogen atom. For this reason, these amine products which are herein contemplated as demulsifying agents in the resolution of petroleum emulsions and which necessarily are characterized by freedom from any aryl groups as such, cannot be derived from aryl amines. They are derived solely from alkyl, alicyclic, or aralkyl amines having at least one hydroxyl group present. It is true that in the aralkyl amines there is an aryl group present, but it is not directly attached to the nitrogen atom as in the case of aryl amines but in fact represents nothing more or less than a substituted alkylamine. For instance, we consider benzylamine as being the primary amine, phenmethyl amine.

Finally, it must be recognized that these materials have not lost any basicity in the forms of the esterfied amine and that they exhibit all the properties of a basic amine, that is, they combine with water to form a base presumably a substituted ammonium compound, but no quaternary ammonium compound insofar that there are always one or two unsubstituted hydrogen atoms of the ammonium radical present. They combine with various acids to form salts. For example, they may be combined with acetic acid, hydrochloric acid, lactic acid, chloracetic acid, nitric acid, butyric acid, phosphoric acid, oxalic acid, or any suitable organic or inorganic acid, to form salts. It is understood that the reference in the specification and appended claims to the amines includes the basic form and the acid salts as well as the amines themselves. The characteristic demulsifying properties of the new compositions of matter herein described are contributed in part by the amine, and it is immaterial whether the amine may be considered as being in any one of the following forms:

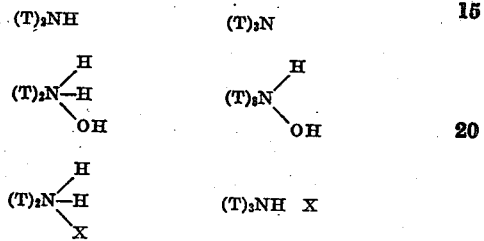

in which T represents the substituents for the amino hydrogen atoms of the parent ammonia, from which all amines are hypothetically derived and X simply represents the acid radical of any acid employed. This statement applies with equal force and effect to the final product, or composition of matter, which is also a basic amine of a more complex type.

Reference is again made to the formula which summarizes the various amines used as intermediate raw materials, viz.:

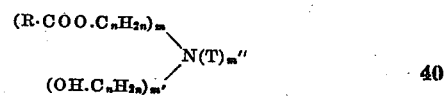

in which the characters have their previous significance.

Attention is directed to the fact that where the substituted alkyl radical $OH.R.COO.C_2H_4—$ appears, a suitable non-aryl radical other than an aliphatic residue may serve as the functional equivalent; for instance, an alicyclic radical; derived from a cyclohexyl radical or an aralkyl radical derived from a benzyl radical. In other words, in the hereto appended claims reference to the $C_nH_{2n}$ radical as such or as an alkyl radical or residue is intended in the broad sense to include the alicyclic radicals or residues or the aralkyl radicals or residues which are the equivalent thereof. There is no intention to include an aromatic radical where there is a direct linkage between the aromatic nucleus and the amino hydrogen atom for the reason that such products have little or no basicity and do not have the characteristic properties of the amines previously described.

In indicating the various hydroxylated tertiary amines of the non-aryl type which may be employed to produce the amine contemplated as the demulsifying agent of the present process, it is desirable to indicate that amines of the type where a hydroxy acyl radical replaces a hydrogen atom of the hydroxyl radical of the hydroxy tertiary amine, are not included within the broad class of hydroxy tertiary amines unless there is another hydroxyl radical attached to the usual alkyl radical. For instance, if ethyl diethanolamine is treated with two moles of lactic acid so as to form the dilactyl compound of the following formula:

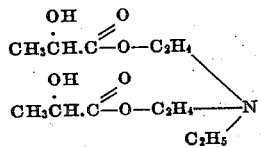

then it is understood that such materials would not represent a hydroxy tertiary amine within the meaning or scope as herein employed. If, on the other hand, triethanolamine were treated with lactic acid so as to give monolactyl triethanolamine of the following composition:

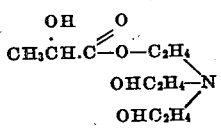

then such compound would be included due to the presence of one or more hydroxyl radicals attached to the alkyl radicals.

Similarly, in indicating the various hydroxylated primary or secondary amines of the non-aryl type which may be employed to produce the amine contemplated as the demulsifying agent of the present process, it is desirable to indicate that amines of the type where a hydroxy acyl radical replaces a hydrogen atom of the hydroxyl radical of a hydroxy primary or secondary amine, are not included within the broad class of hydroxy tertiary amines unless there is another hydroxyl radical attached to the usual alkyl radical. For instance, if ethanolamine is treated with lactic acid so as to form the lactyl derivative of the following formula:

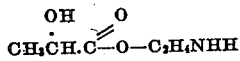

then it is understood that such materials would not represent a hydroxy primary amine within the meaning or scope as herein employed. The same would be true of the corresponding product derived from diethanolamine, provided that both hydroxy radicals had been esterified with lactic acid.

The manufacture of compounds from tertiary amines is relatively simple, because no precautions are necessary to prevent amidification. The selected detergent-forming acid, or ester, as for example, a fatty oil and the selected hydroxy tertiary amine, are mixed in suitable proportions and heated at some point above the boiling point of water, for instance, 110° C., and at a point below the decomposition point of the amine or the fatty oil, for instance, 180° C., for a suitable period of time, such as two to eight hours. Mild agitation is employed. A catalyst, such as sodium oleate, sodium carbonate, caustic soda, etc., may be present in amounts of about one-half of 1% or less. It is noted that the fatty acids are employed in this instance in the form of an ester, to-wit, the glyceride, although as previously pointed out, other functional equivalents can be readily employed with equal facility. It is to be noted that the reactions above described do not take place to any appreciable extent if the fatty acid has been converted into the soap or salt. Such salts are not functional equivalents. As previously indicated, an ester of abietic acid might be employed, if desired.

When, however, one is employing a hydroxy secondary amine, precautions must be taken so that one gets a substantial percentage of products derived by esterification, rather than amidification. Any suitable ester may be employed, but it is often most convenient to employ the glyceride of a fatty acid, for instance, triricinolein.

The selected glyceride and the selected hydroxy secondary amine are mixed in suitable proportions and heated at some point above the boiling point of the amine or fatty material, for instance, 180° C., for a suitable period of time such as 4–24 hours. Mild agitation is employed. A catalyst, such as sodium oleate, sodium carbonate, caustic soda, etc., may be present in amounts of about ½% or less. It is to be noted that the fatty acids are present in ester form and not in the form of the free acid, and thus there is no tendency to form the salt to any marked extent, and if conducted at the lower range of reaction temperatures, there is a decided tendency to form the esterification products, rather than the amidification products.

In order to illustrate suitable examples of the amines which may be used as intermediate raw materials, the following examples are given:

*Intermediate amine—Example 1*

Castor oil is employed. For sake of convenience, its molecular weight is considered as being 925. Commercial triethanolamine and castor oil in the proportion of one mole of castor oil and three moles of triethanolamine are heated to a temperature between 150–180° C. for two hours. Mild agitation is employed. The reaction product so produced may be used as such, or may be converted into the acetate or other suitable form.

*Intermediate amine—Example 2*

The same procedure is followed as in Intermediate amine—Example 1, except that the ratio employed is two moles of the castor oil to three moles of triethanolamine.

*Intermediate amine—Example 3*

One mole of methyl naphthenate is reacted in the manner previously described with one mole of triethanolamine.

*Intermediate amine—Example 4*

Diethanolamine is substituted for the triethanolamine employed in Example 3.

*Inntermediate amine—Example 5*

Methyl abietate is substituted for the methyl naphthenate used in Examples 3 and 4 above.

*Intermediate amine—Example 6*

Olive oil is substituted for the castor oil used in Examples 1 and 2 above.

*Intermediate amine—Example 7*

Ethyl diethanolamine is substituted for the triethanolamine used in previous examples where triethanolamine has been employed, but ratios changed, if required, so that there is always one non-esterified ethanol radical present.

*Intermediate amine—Example 8*

Cyclohexyl diethanolamine is substituted for triethanolamine in previous examples where triethanolamine has been employed, but subject to the same modification as indicated in Example 7 immediately preceding.

*Intermediate amine—Example 9*

Benzyl diethanolamine is substituted for triethanolamine in previous examples where it has been employed. (See modification noted in Examples 7 and 8 immediately above.)

Having prepared the relatively simpler intermediate amine of the kind previously described, the second step in the preparation of the new composition of matter is to produce an esterified amine of the kind obtainable by reaction of the intermediate amine above described and a polybasic carboxy acid or its functional equivalent, such as the anhydride, with the proviso that such functional equivalent shall not include (a) the acid esters derived by reaction between a polybasic acid, such as phthalic acid or its anhydride, and an alcohol acid (hydroxy acid) such as ricinoleic acid and the like; or (b) the acid ester derived by a reaction between a polybasic carboxy acid, such as phthalic acid and its anhydride, and a fractional ester of the detergent-forming acid, such as mono-olein, mono-naphthenin, mono-abietin, etc.

These last mentioned classes of materials which are not contemplated in this present application are described in copending applications for patents, Serial Nos. 211,036, filed May 31, 1938, by Melvin De Groote, and 211,038, filed May 31, 1938, by Melvin De Groote.

The polybasic carboxy acids which may be employed, including some having at least three carboxyl radicals, are phthalic, succinic, malic, fumaric, citric, maleic, adipic, tartaric glutaric, diphenic, naphthalic, oxalic, etc.

Having prepared the intermediate amines above described it is only necessary to react such amines with the selected polybasic carboxy acid or its functional equivalent in such a manner as to produce an esterified product as differentiated from a salt. There is no objection to salt formation, provided that esterification also takes place.

Composition of matter—Example 1

Castor oil is reacted with triethanolamine (see Example 1 in previous group of Intermediate amine examples) so as to produce a material corresponding to

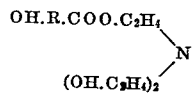

in which OH.RCOO represents the ricinoleic acid radical. One molecular weight of this material is reacted with three molecular weights of phthalic anhydride. This is a conventional esterification reaction, and the materials are intimately mixed and heated to approximately 120–160° C. with constant agitation until samples taken from the batch and analyzed show substantially complete disappearance of the hydroxyl value and substantially no free phthalic anhydride. In event that the hydroxyl value disappears and phthalic anhydride is still present, the amount should be decreased approximately 2¼ or 2½ moles or thereabouts. A suitable solvent may be present, and any water formed may be distilled off continuously during the esterification process. The solvent may remain behind in the final product or may be removed if desired. If desired, the acidic mass may be neutralized with any suitable amine, such as triethanolamine, cyclohexylamine, triamylamine, etc.

Composition of matter—Example 2

Butyl acid phthalate is substituted for phthalic anhydride in the previous example.

Composition of matter—Example 3

Potassium acid phthalate is substituted for phthalic anhydride in Composition of matter—Example 1 above.

Composition of matter—Example 4

The same procedure is followed as in Composition of matter—Example 1 above, except that no solvent is employed, and when the reaction is complete, one to two moles or slightly less of glycerol are added and esterification continued until all the glycerol present is chemically combined.

Composition of matter—Example 5

Ethylene glycol is substituted for glycerol in Composition of matter—Example 4 immediately preceding.

Composition of matter—Example 6

Diethylene glycol is substituted for glycerol in Composition of matter—Example 4 immediately preceding.

Composition of matter—Example 7

The monoethyl ether derivative of ethylene glycol is employed in place of glycerol in Composition of matter—Example 4 above.

Composition of matter—Example 8

Octyl alcohol is substituted for glycerol in Composition of matter—Example 4 above.

Composition of matter—Example 9

Oleyl alcohol is substituted for glycerol in Composition of matter—Example 4 above.

Composition of matter—Example 10

Maleic anhydride is substituted for phthalic anhydride in Composition of matter—Examples 1–9 inclusive.

Composition of matter—Example 11

Citric acid is substituted for phthalic acid in Composition of matter—Examples 1–9 inclusive.

Composition of matter—Example 12

Other intermediate amines of the kind described under the heading Intermediate amine—Examples 2–9 inclusive, are substituted for intermediate amines in the prior examples.

Attention is directed to the fact that the alkylolamines are obtained in such a manner that they may be looked upon as being derivatives of dihydric alcohols, or of the chlorhydrins of the dihydric alcohols. For example, the alkylolamines may be formed in the following manner:

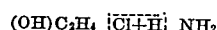

As previously stated, the C₂H₄ radical may be any one of a number of hydrocarbon radicals which are aliphatic, alicyclic, or aralkyl in nature.

It is at once manifest that similar derivatives are available from glycerols, polyglycerols, and the like, as indicated by the following reaction:

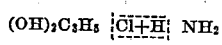

It is not necessary to point out that the same types of reactions will produce secondary or tertiary amines and that the reaction is not limited to a combination with ammonia, but may take place with a combination of other primary or secondary amines, such as amylamine, diamylamine, cyclohexylamine, dicyclohexylamine, benzylamine, dibenzylamine, amyl cyclohexylamine, etc.

This means that in the type of material previously described, there is a wide variety of material, such as monoglycerylamine, diglycerylamine, monoglyceryl diethylamine, monoglyceryl dipropylamine, diglyceryl propylamine, triglycerylamine, etc., which are functional equivalents of the various amines previously described for reaction with triricinolein and the like. When such amines are employed instead of the radical —$C_nH_{2n}$— appearing in a compound, one would have in place thereof the radical —$OH.C_3H_5$—; or in case the hydroxyl radical of these —$OH.C_3H_5$— radical had been removed by esterification with any available carboxyl, then the substituent which replaces the —$C_nH_{2n}$— radical might be indicated by the formula —$D.C_3H_5$—. All that has been said here in regard to functional equivalents will be perfectly obvious without further explanation to those skilled in the art. See U. S. Patent No. 2,091,704, dated August 31, 1937, to Duncan and McAllister, and also U. S. Patent No. 2,042,621, dated June 2, 1936, to Olin.

Similarly, it is evident that where reference is made to phthalic acid, some simple derivative, such as chlorinated phthalic acid, brominated phthalic acid, methylated phthalic acid, or the like, would simply act as a functional equivalent. This applies not only to phthalic acid, but all the dibasic acids enumerated. Similarly, it is evident that there is no intention to differentiate between isomeric forms. One isomeric form may serve as well as another.

We desire to emphasize that the products obtained in the above examples may be used in the form of the amine by direct contact with the emulsion without contact with water. It may be contacted with water, i. e., in the form of a solution so as to produce in a greater or lesser degree the amine base. Furthermore, any of the products above described may be combined with a suitable acid. Acetic acid may be employed. Hydrochloric acid is particularly desirable. In some instances acids, such as oleic acid or naphthenic acid, may be employed to give a suitable salt. As previously pointed out, any carboxylic hydrogen atom may be replaced by a suitable metallic atom or an organic radical derived from an alcohol or from an amine. All such ionizable hydrogen atom equivalents are considered as the functional equivalent of the ionizable hydrogen atoms themselves, and such neutralized forms are included in the scope of the appended claims as the equivalent of the acidic form. The expression "fatty acid compound" is employed to include the acid itself, as well as salts and esters thereof. It is realized that where a free carboxyl and a basic amine residue exist in the same molecule, there may be a tendency towards the formation of inner salts comparable to sulfanilic acid; but due to the size of the molecule involved and perhaps for reasons of steric hindrance, we are not aware that such inner salts are formed.

Briefly, then, the preparation of the composition of matter herein contemplated depends on a reaction involving a polybasic carboxy acid body, or its functional equivalent as described, and the complex amine of the kind described, in such a manner as to involve reactions other than salt formation. In other words, the complex amines are basic in nature, and therefore could react with a polybasic acid to form a salt in a manner which, for sake of convenience, will be indicated by a somewhat simpler reaction, thus

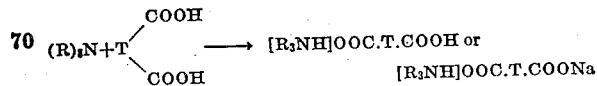

Such reactions are purely salt formation. The materials of the kind herein contemplated, regardless of their nature, are of the kind obtained by reactions other than salt formation, and also other than amidification.

We desire to emphasize that the expression "polybasic carboxy acid" employed in the claims refers not only to the acid itself, but to any functional equivalent, such as the anhydride, the acyl chloride, a salt form having at least two free carboxyls, such as mono-sodium citrate, etc. It is also understood that in the hereto appended claims the nature of the final product is not limited to the form having a free carboxylic hydrogen atom, but that such free carboxylic hydrogen atom may be actually replaced by any functional equivalent of the kind previously described, for instance, a metallic atom, an ammonium radical, an amine radical, such as an amylamine radical, benzylamine radical, ethanolamine radical, diethanolamine radical, triethanolamine radical, a hydrocarbon radical, such as an ethyl, methyl, propyl, or amyl radical, a radical derived from ethylene glycol, glycerol, or the like; a cyclohexyl radical, benzyl radical, etc. All such forms in which such ionizable hydrogen atom equivalent replaces an ionizable hydrogen atom, are obvious functional equivalents.

Attention is directed to the fact that the word "amidification" has been applied to the reaction involving the replacement of an amine hydrogen atom by an acyl radical without conventional limitation to a reaction involving ammonia. The replacement of the amino hydrogen atom of a primary amine or a secondary amine by an acyl radical has been considered as being amidification rather than the formation of a substituted amide or the formation of an imide or substituted imide. Such obvious departure from conventional nomenclature has been for purposes of simplicity and to show the similarity between certain reactions.

In the hereto appended claims, reference to the product derived by reaction between a polybasic carboxy acid body of the kind previously described and an amine of the kind previously described is meant to refer to such products in all their various modifications previously referred to, to-wit, such substances where carboxylic hydrogen atoms appear as such or have been replaced by metallic atoms, alkyl radicals derived from various alcohols, amine radicals or residues, etc.; and as to the presence of any basic amine-nitrogen atom, it may be in the amine form or in salt form, or in a base form, as, for example, is obtainable by contact with water.

The functional equivalents of all these variations have been pointed out previously and are readily comprehended; and the scope of the claims in the light of such obvious equivalents requires no further discussion.

As to blown oils, blown fatty acids, polymerized oils, polymerized fatty acids, and other similar materials obtainable by oxidation, it is understood that it is not intended that they should be reacted with amines to produce the intermediate amine which in turn is reacted with a polybasic carboxy acid to produce the new composition of matter.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000 or 1 to 20,000 or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing our process, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

Having thus described our invention, what we claim as new and desire to secure by Letters Patent is:

1. A composition of matter, comprising products of the kind derivable by esterification reactions between: first, an amine of the formula type

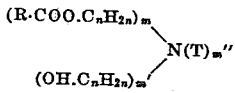

in which R.COO represents the oxy-acyl radical derived from a detergent-forming monocarboxy acid having not more than 32 carbon atoms; T represents a hydrogen atom or a non-hydroxy hydrocarbon radical or the acylated radical derived by replacing a hydrogen atom of the hydroxyl group of an alkylol radical by the acyl radical of a monobasic carboxy acid having less than 8 carbon atoms; $n$ represents a small whole number which is less than 10; $m$ represents the number 1 or 2; $m'$ represents the number 1 or 2, and $m''$ represents the number 0 or 1, with the proviso that $m+m'+m''=3$; and, second, a polybasic carboxy acid compound characterized by: (a) the presence of at least one free carboxy radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

2. A composition of matter, comprising products of the kind derivable by esterification reactions between: first, an amine of the formula type

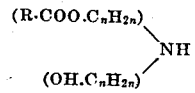

in which R.COO represents the oxy-acyl radical derived from the detergent-forming monocarboxy acid having not more than 32 carbon atoms; and $n$ is a small whole number less than 10; and, second, a polybasic carboxy acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

3. A composition of matter, comprising products of the kind derivable by esterification reactions between: first, an amine of the formula type

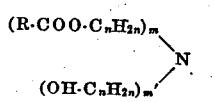

in which R.COO represents the oxy-acyl radical derived from the detergent-forming monocarboxy acid having not more than 32 carbon atoms; $n$ represents a small whole number which is less than 10; $m$ represents the number 1 or 2; $m'$ represents the number 1 or 2, with the proviso that $m+m'=3$; and, second, a polybasic carboxy acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

4. A composition of matter, comprising products of the kind derivable by esterification reactions between: first, an amine of the formula type

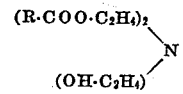

in which R.COO is an oxy-acyl radical derived from a fatty acid; and, second, a polybasic carboxy acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

5. A composition of matter, comprising products of the kind derivable by esterification reactions between: first, an amine of the formula type

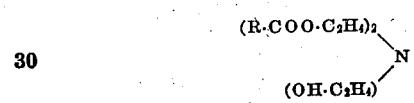

in which R.COO is an oxy-acyl radical derived from a fatty acid; and, second, a polybasic carboxy acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

6. A composition of matter, comprising products of the kind derivable by esterification reactions between: first, an amine of the formula type

in which R.COO is an oxy-acyl radical derived from a fatty acid; and, second, a phthalic acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

7. A composition of matter, comprising products of the kind derivable by esterification reactions between: first, an amine of the formula type

in which R.COO is an oxy-acyl radical derived from a fatty acid; and, second, a phthalic acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

8. A composition of matter, comprising products of the kind derivable by esterification reactions between: first, an amine of the formula type

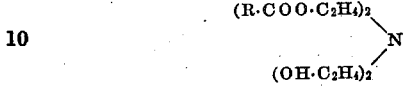

in which R.COO is an oxy-acyl radical derived from a fatty acid; and, second, phthalic anhydride.

9. A composition of matter, comprising products of the kind derivable by esterification reactions between: first, an amine of the formula type

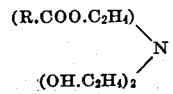

in which R.COO is an oxy-acyl radical derived from a fatty acid; and, second, phthalic anhydride.

10. A process for breaking petroleum emulsions of the water-in-oil type, characterized by subjecting the emulsion to the action of a demulsifying agent comprising products of the kind derivable by esterification reaction between: first, an amine of the formula type

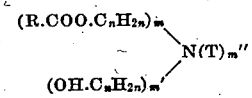

in which R.COO represents the oxy-acyl radical derived from the detergent-forming monocarboxy acid having not more than 32 carbon atoms; T represents a hydrogen atom or a non-hydroxy hydrocarbon radical or the acylated radical derived by replacing a hydrogen atom of the hydroxyl group of an alkylol radical by the acyl radical of a monobasic carboxy acid having less than 8 carbon atoms; $n$ represents a small whole number which is less than 10; $m$ represents the number 1 or 2; $m'$ represents the number 1 or 2, and $m''$ represents the number 0 or 1, with the proviso that $m+m'+m''=3$; and, second, a polybasic carboxy acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

11. A process for breaking petroleum emulsions of the water-in-oil type, characterized by subjecting the emulsion to the action of a demulsifying agent comprising products of the kind derivable by esterification reaction between: first, an amine of the formula type

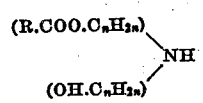

in which R.COO represents the oxy-acyl radical derived from the detergent-forming monocarboxy acid having not more than 32 carbon atoms; and $n$ is a small whole number less than 10; and, second, a polybasic carboxy acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

12. A process for breaking petroleum emulsions of the water-in-oil type, characterized by subjecting the emulsion to the action of a demulsifying agent comprising products of the kind derivable by esterification reaction between: first, an amine of the formula type

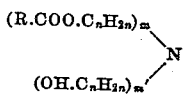

in which R.COO represents the oxy-acyl radical derived from the detergent-forming monocarboxy acid having not more than 32 carbon atoms; $n$ represents a small whole number which is less than 10; $m$ represents the number 1 or 2; $m'$ represents the number 1 or 2, with the proviso that $m+m'=3$; and, second, a polybasic carboxy acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

13. A process for breaking petroleum emulsions of the water-in-oil type, characterized by subjecting the emulsion to the action of a demulsifying agent comprising products of the kind derivable by esterification reaction between: first, an amine of the formula type

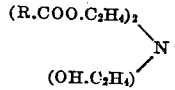

in which R.COO is an oxy-acyl radical derived from a fatty acid; and, second, a polybasic carboxy acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

14. A process for breaking petroleum emulsions of the water-in-oil type, characterized by subjecting the emulsion to the action of a demulsifying agent comprising products of the kind derivable by esterification reaction between: first, an amine of the formula type

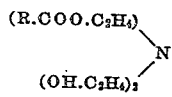

in which R.COO is an oxy-acyl radical derived from a fatty acid; and, second, a polybasic carboxy acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

15. A process for breaking petroleum emulsions of the water-in-oil type, characterized by subjecting the emulsion to the action of a demulsifying agent comprising products of the kind derivable by esterification reaction between: first, an amine of the formula type

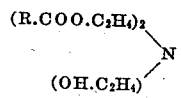

in which R.COO is an oxy-acyl radical derived from a fatty acid; and, second, a phthalic acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

16. A process for breaking petroleum emulsions of the water-in-oil type, characterized by subjecting the emulsion to the action of a demulsifying agent comprising products of the kind derivable by esterification reaction between: first, an amine of the formula type

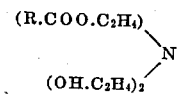

in which R.COO is an oxy-acyl radical derived from a fatty acid; and, second, a phthalic acid compound characterized by: (a) the presence of at least one free carboxyl radical; (b) the absence of any hydroxy fatty acid radical as a substituent for an acidic hydrogen atom of any carboxyl radical; (c) the absence of any polyhydric alcohol radical as a substituent for an acidic hydrogen atom of any carboxyl radical if said polyhydric alcohol radical is also united with one or more monobasic carboxy detergent-forming acid radicals.

17. A process for breaking petroleum emulsions of the water-in-oil type, characterized by subjecting the emulsion to the action of a demulsifying agent comprising products of the kind derivable by esterification reaction between: first, an amine of the formula type

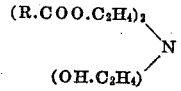

in which R.COO is an oxy-acyl radical derived from a fatty acid; and, second, phthalic anhydride.

18. A process for breaking petroleum emulsions of the water-in-oil type, characterized by subjecting the emulsion to the action of a demulsifying agent comprising products of the kind derivable by esterification reaction between: first, an amine of the formula type

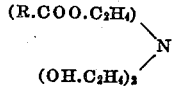

in which R.COO is an oxy-acyl radical derived from a fatty acid; and, second, phthalic anhydride.

MELVIN DE GROOTE.
BERNHARD KEISER.
CHARLES M. BLAIR, Jr.

Certificate of Correction

Patent No. 2,154,423. April 18, 1939.

MELVIN DE GROOTE ET AL.

It is hereby certified that errors appear in the printed specification of the above numbered patent requiring correction as follows: Page 3, first column, line 55, for "freedrom" read *freedom*; page 8, first column, lines 9 to 12 inclusive, strike out the formula and insert instead the following—

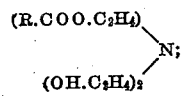

and that the said Letters Patent should be read with these corrections therein that the same may conform to the record of the case in the Patent Office.

Signed and sealed this 6th day of June, A. D. 1939.

Henry Van Arsdale

[SEAL]

*Acting Commissioner of Patents.*